US010773424B1

(12) United States Patent
Patrick

(10) Patent No.: US 10,773,424 B1
(45) Date of Patent: Sep. 15, 2020

(54) STRUCTURAL COMPLEX MOLD

(71) Applicant: Shark Wheel, LLC, Lake Forrest, CA (US)

(72) Inventor: David Michael Patrick, Lake Forrest, CA (US)

(73) Assignee: Shark Wheel, Inc., Lake Forest, CA (US)

( * ) Notice: Subject to any disclaimer, the term of this patent is extended or adjusted under 35 U.S.C. 154(b) by 0 days.

(21) Appl. No.: 14/454,591

(22) Filed: Aug. 7, 2014

(51) Int. Cl.
*B29C 33/00* (2006.01)
*C03B 19/02* (2006.01)
*B22C 9/22* (2006.01)

(52) U.S. Cl.
CPC .............. *B29C 33/005* (2013.01); *B22C 9/22* (2013.01); *B29C 33/0061* (2013.01); *C03B 19/02* (2013.01)

(58) Field of Classification Search
CPC ....... B29C 33/05; B29C 33/0061; B29C 9/22; B29C 9/28; C03B 19/02; C03B 19/025; B29D 99/0014; B29L 2031/52; A63C 17/12; A63C 17/012; A63C 17/015; A63C 2203/12; A63C 17/014; A63C 2203/42; A63C 17/017; A63C 17/01; A63C 2203/24; A63C 17/016; A63C 17/26; A63C 2203/14; A63C 17/0006; A63C 2203/22; A63C 17/0093; A63C 17/226; A63C 2203/18; A63C 17/0046; A63C 17/08; A63C 17/262; A63C 19/065; A63C 2019/067; A63C 17/0033; A63C 17/006; A63C 17/04; A63C 17/223; A63C 17/265; A63C 17/002; A63C 17/004; A63C 17/0073; A63C 17/011; A63C 17/1427; A63C 2017/1463; A63C 2017/1472; A63C 2203/06; A63C 2203/40; A63C 10/28; A63C 11/027; A63C 11/22; A63C 11/221; A63C 11/222; A63C 11/227; A63C 17/00; A63C 17/0013; A63C 17/0026; A63C 17/013; A63C 17/02; A63C 17/045; A63C 17/06; A63C 17/10; A63C 17/14; A63C 17/1409; A63C 17/1418; A63C 17/1436; A63C 17/18; A63C 17/24; A63C 17/28; A63C 2203/10; A63C 2203/20; A63C 2203/54; A63C 5/03; A63C 5/035;

(Continued)

(56) References Cited

U.S. PATENT DOCUMENTS 4,040,670 A * 8/1977 Williams ............... A63C 17/22
301/5.308
4,133,371 A * 1/1979 Birch ....................... B22C 9/20
164/350

(Continued)

*Primary Examiner* — Leith S Shafi
(74) *Attorney, Agent, or Firm* — Marin Cionca; CIONCA IP Law P.C.

(57) ABSTRACT

A mold having an upper, medial, and lower bodies with a composite peripheral wall define an inside cavity which may have a complex shape as for instance, with circular protrusions, circular depressions, and axially aligned cylinders. Pour holes are provided for introducing a molding compound into the mold while allowing air to exit the cavity. The medial body may be made of multiple portions. The upper body may be axially lifted off the medial body and the medial body may be laterally moved away from the molded object which enables removal of the complex molded part.

14 Claims, 5 Drawing Sheets

(58) Field of Classification Search
CPC ....... A63C 5/0405; A63C 5/0417; A63C 5/08; A63C 5/126
USPC ....... 249/105, 164, 117, 136, 139, 141, 142, 249/149, 160, 166, 167, 170, 171, 172
See application file for complete search history.

(56) References Cited

U.S. PATENT DOCUMENTS

| | | | | |
|---|---|---|---|---|
| 5,312,844 | A * | 5/1994 | Gonsior | A63C 17/223 152/DIG. 18 |
| 5,531,949 | A * | 7/1996 | Heitfiled | A63C 17/223 249/134 |
| 5,630,891 | A * | 5/1997 | Peterson | A63C 17/223 152/165 |
| 8,899,967 | B2 * | 12/2014 | Vannarsdall | B29C 45/2711 425/595 |
| 2013/0337104 | A1 * | 12/2013 | Vannarsdall | B29C 45/2711 425/595 |

* cited by examiner

STRUCTURAL COMPLEX MOLD

BACKGROUND

This disclosure relates to molds and methods of molding. Molding is a manufacturing process where liquid or pliable raw material is introduced into a rigid frame called a mold or matrix. Materials that lend themselves to a molding process include plastic, glass, metal, ceramic and others. The liquid hardens or sets inside the mold, adopting the mold's interior surface conformation. The common bi-valve molding process uses two mold portions, one for each half of an object. A release agent may be used to make removal of the molded object from the mold easier. When an object has a complex shape, that is, with protrusions and depressions in more than one direction in 3-space, it may be impossible to remove the finished part from a simple mold. The mold described and illustrated herein solves this problem for certain types of complex parts, as will be disclosed.

BRIEF DESCRIPTION OF DRAWINGS

Like reference symbols in the drawing figures indicate like elements.

DETAILED DESCRIPTION

Figure 1:
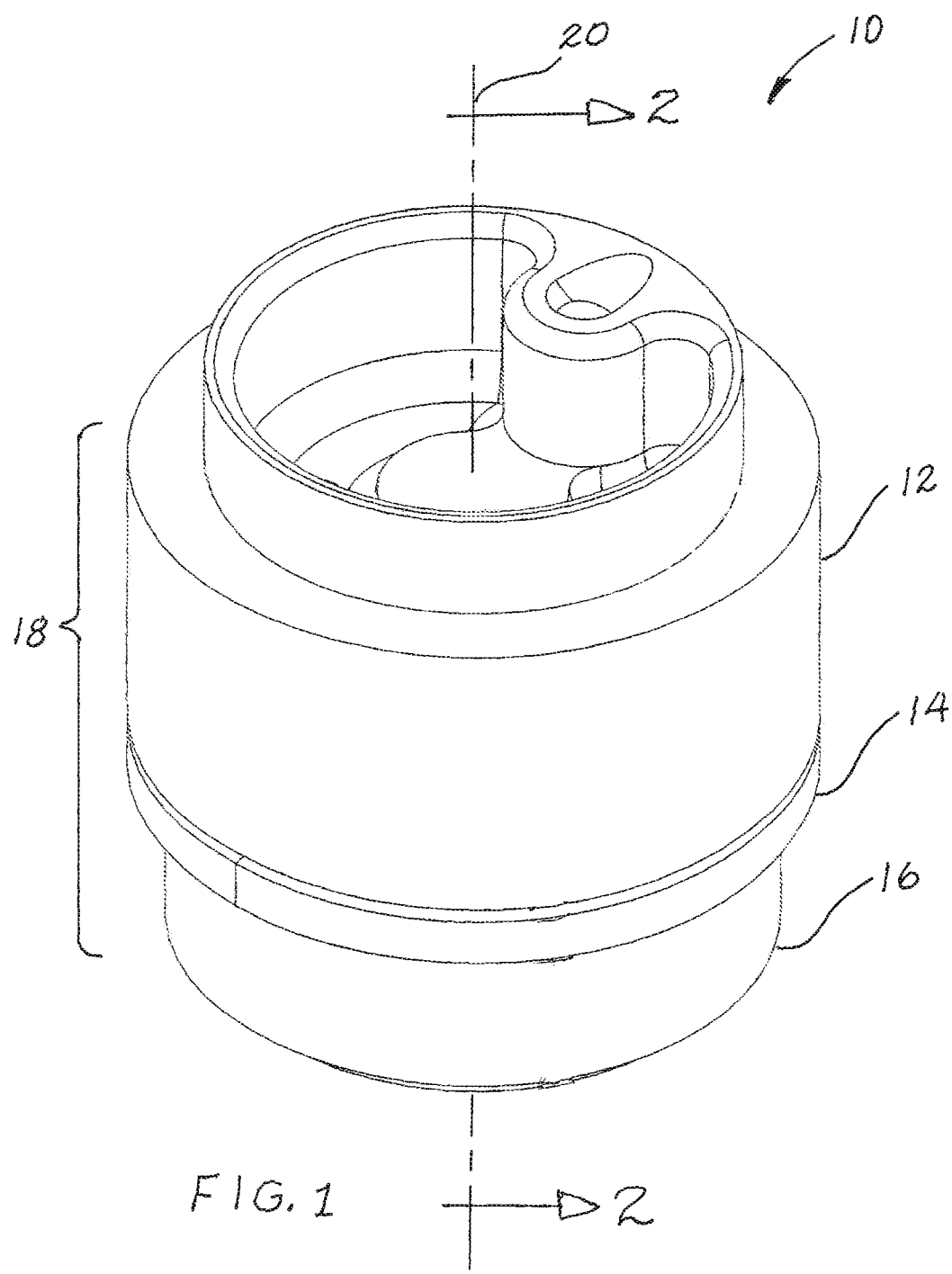
FIG. 1 is an example top perspective view of an exterior of embodiments of a presently disclosed mold having upper, medial and lower body portions.

When molding complex shaped objects a mold must separate in at least two directions in 3-space. Such molds may have a plurality of separable parts which may be held together with relatively complex interlocking hardware, clamps, and so forth. Such molds may be expensive to manufacture and expensive to use as assembly and disassembly may be time consuming. The presently described and illustrated apparatus, see FIGS. 1-5, is a mold 10 for molding complex objects by the well-known pour and cure method. Mold 10 is quickly assembled and disassembled and self-constraining. Another problem that may arise in static molding is that the moldate (the material that is cured to form the molded object) may tend to expand during the curing process. Therefore, the mold must have reinforcement to prevent mold cracking and bursting. Various embodiments of Mold 10 have such features as will be described in the following.

In embodiments, mold 10 may have an upper 12, medial 14, and lower 16 structural bodies each of which may be made of a rigid material such as steel or other metal, or of an engineering polymer, composite or other rigid material. Bodies 12, 14, and 16, may have a composite peripheral wall 18 concentric or symmetrical about a vertical central axis 20 and may, by their respective shapes, define an inside cavity surface 30. Inside cavity surface 30 may define at least one circular protrusion 32, at least one circular depression 34, and at least one axially aligned cylinder 36 all of which are clearly shown in FIGS. 2-4. Clearly, other shapes may be used for molding other objects. The at least one circular protrusion 32 may be wave-shaped and may comprise at least two adjacent said circular protrusions 32 as shown. The at least one circular depression 34 may be wave-shaped as well and may comprise at least two spaced-apart circular depressions 34 as shown. The at least one axially aligned cylinder 36 may include two axially spaced apart and axially aligned cylinders 36 as shown. The two spaced apart cylinders 36 may have mutually facing and axially aligned central holes 37 which may be used to form a central axle of a molded object such as a wheel. These aspects of surface 30 define an object that may be molded within mold 10, but other objects or modifications to the current surface 30 and current object may be made alternatively.

Figure 2:
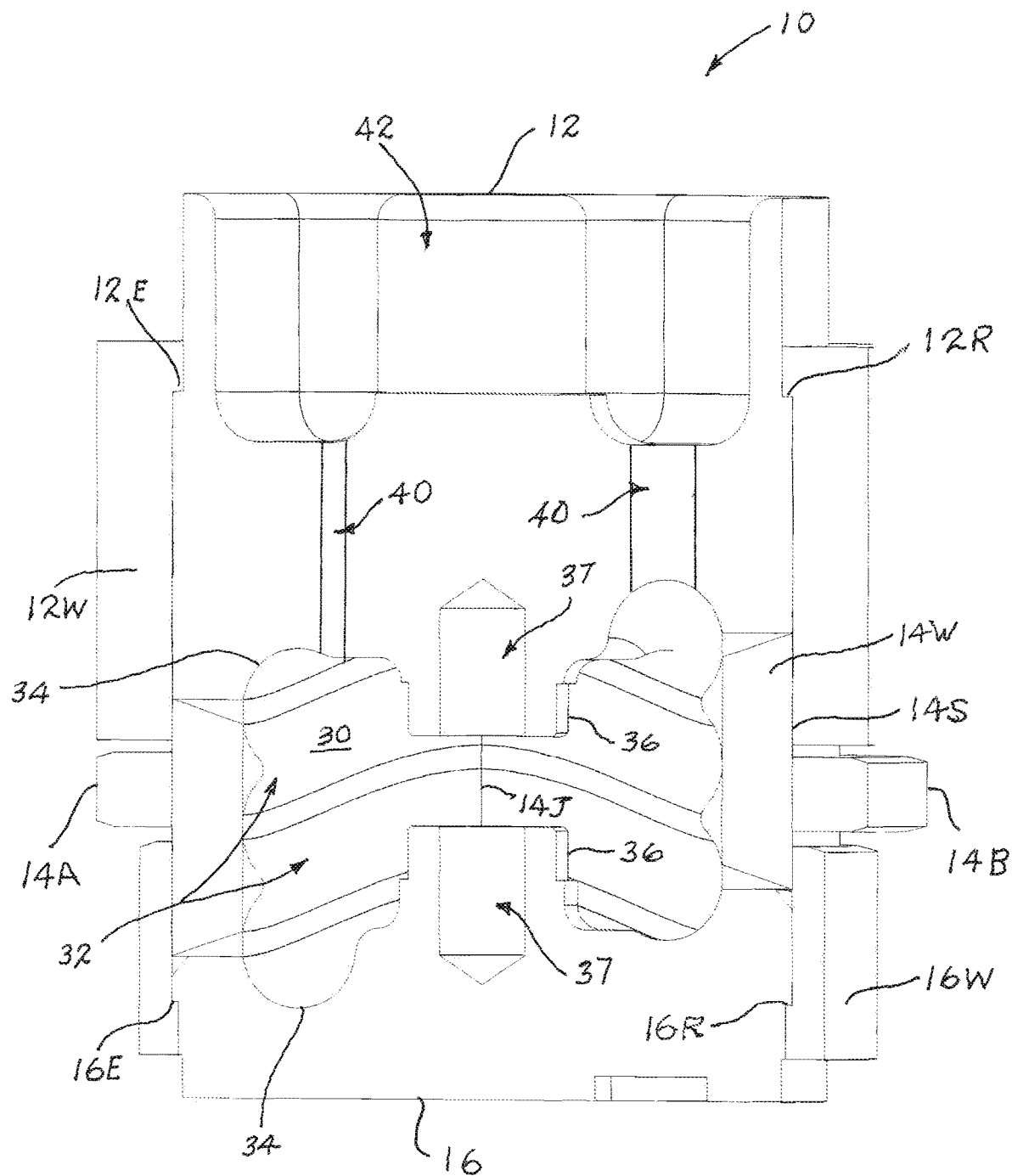
FIG. 2 is a perspective view thereof taken from a cutting plane defined by axis 20 and arrows 2-2 of FIG. 1.

FIG. 2 shows embodiments wherein the upper one of said bodies 12 may have at least two pour holes 40 which join a top cavity 42 with inside cavity surface 30. When a molding compound (not shown) is introduced into top cavity 42 one of the pour holes 40 delivers the molding compound into mold 10 while the second one of the pour holes 40 allows air to escape from mold 10.

Figure 5:
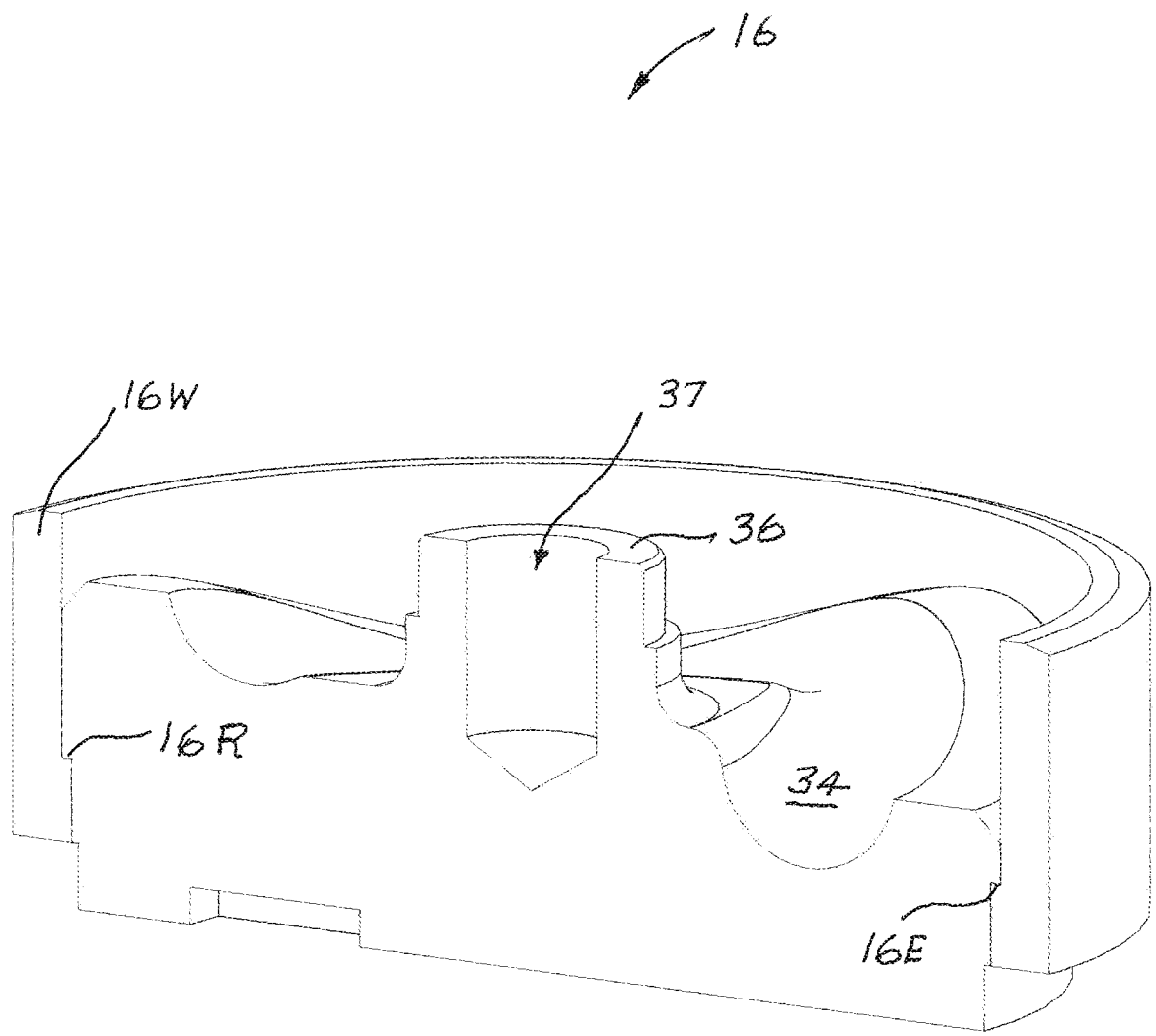
FIG. 5 is a perspective view of the lower body shown in FIG. 2.

FIGS. 2 and 5 show embodiments wherein the medial one of said bodies 14 may comprise two separate portions 14A and 14B which when abutted may have a circular conformation or may have a conformation other than circular. Portions 14A and 14B may be mirror images in shape or may be identical in shape. Medial body 14 may be made up of more than two portions which, as above, may form a circular shape.

FIG. 2 shows embodiments wherein composite peripheral wall 18 may comprise an upper 12W, a medial 14W, and a lower 16W peripheral wall portions which may be concentric about central axis 20 in order to form a strong structure. Upper 12W and lower 16W peripheral wall portions may abut an external surface 14S of medial wall portion 14W in order to hold the plural portions of body 14 in a tight fitting arrangement with no chance for molding compound to leak through joints 14J. As further shown in FIG. 2, peripheral walls 12W and 16W may be slidingly engaged with upper 12 and lower 16 bodies respectively for ease of assembly and may have ID extensions 12E and 16E that may be positioned against circular recesses 12R and 16R respectively as shown in order to advantageously position walls 12W and 16W relative to bodies 12, 14, and 16.

Figure 3:
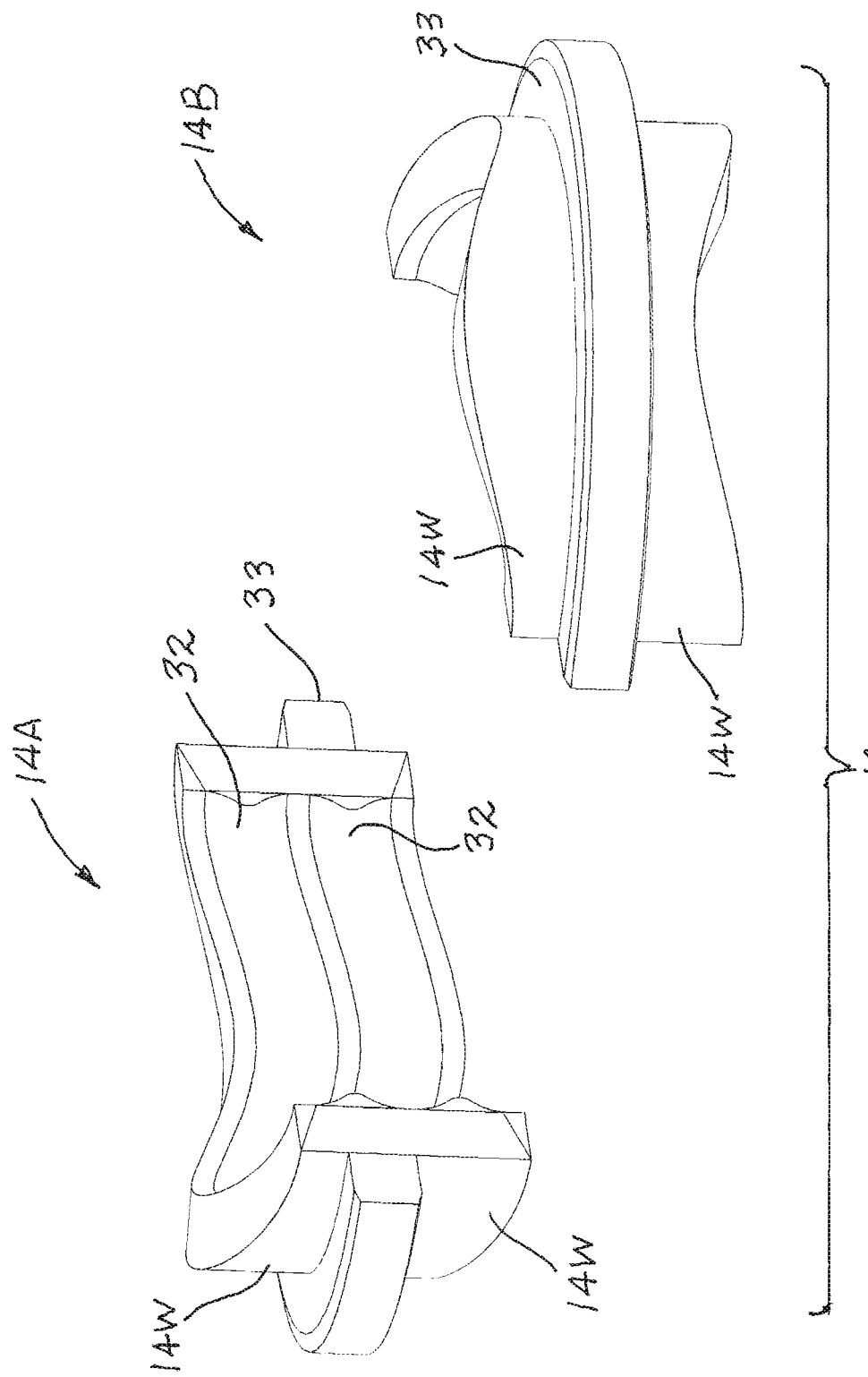
FIG. 3 is a perspective separated view of portions of the medial body thereof.
Figure 4:
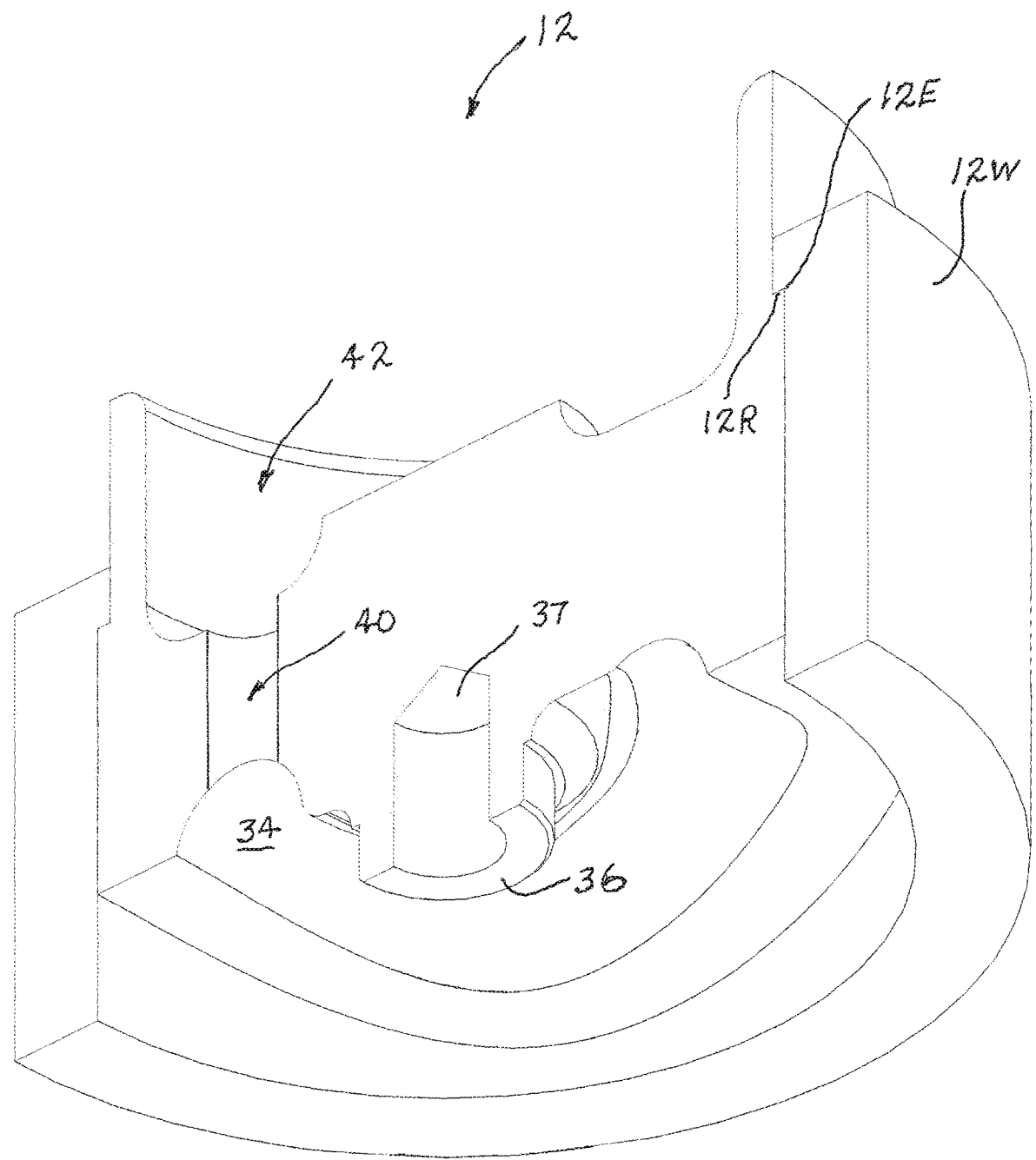
FIG. 4 is a bottom perspective view of the upper body shown in FIG. 2.

FIG. 3 shows embodiments wherein body 14 and wall 14W may have an outside external ring flange 33 which provides a necessary structural restraining force against expansion forces exerted as curing of the molded object occurs.

Embodiments of the subject apparatus and method have been described herein. Nevertheless, it will be understood that modifications by those of skill in the art may be made without departing from the spirit and understanding of this disclosure. Accordingly, other embodiments and approaches are within the scope of the following claims.

What is claimed is:

1. A mold comprising:

An upper, medial, and lower bodies, said bodies having peripheral walls defining a vertical central axis and an inside cavity surface having same vertical central axis when said bodies are in mutual contact, said inside cavity surface defining at least one circular protrusion having same vertical central axis, at least one circular depression having same vertical central axis, and at least one axially aligned cylinder, wherein the at least one circular protrusion is wave-shaped while also being circular in at least one horizontal plane that is perpendicular to the vertical central axis and wherein the at least one circular depression is also wave-shaped while also being circular in at least one horizontal plane that is perpendicular to the vertical central axis.

2. The mold of claim 1 wherein the at least one circular protrusion is two adjacent said circular protrusions.

3. The mold of claim 1 wherein the at least one circular depression is two spaced apart said circular depressions.

4. The mold of claim 3 wherein the at least one axially aligned cylinder is two axially spaced apart and axially aligned cylinders.

5. The mold of claim 4 wherein the two spaced apart cylinders have facing central holes.

6. The mold of claim 1 wherein the upper one of said bodies has at least two pour holes therein, said pour holes joining a top cavity of said upper one of said bodies with the inside cavity surface.

7. The mold of claim 1 wherein the medial one of said bodies comprises at least two separate portions which when abutting have a circular conformation.

8. The mold of claim 7 wherein the at least two separate portions are identical in shape.

9. The mold of claim 1 wherein the peripheral wall comprises an upper, a medial, and a lower peripheral wall portions, said wall portions being concentric about the central axis.

10. The mold of claim 9 wherein the upper and lower peripheral wall portions abut an external surface of the medial wall portion.

11. The mold of claim 1 wherein the upper body rests on the medial body and the medial body rests on the lower body when the inside cavity surface is aligned with the central axis.

12. A mold comprising:
an upper, medial, and lower bodies, said bodies having peripheral walls, a vertical central axis and an inside cavity surface having the same vertical central axis, said inside cavity surface defining a shape of a single object to be molded within said mold;
the upper one of said bodies has at least two pour holes therein, said pour holes joining a top cavity of said upper one of said bodies with the inside cavity surface; wherein the medial one of said bodies comprises at least two separate portions which when abutted have a selected conformation;
the peripheral walls comprise an upper, a medial, and a lower wall portions, said wall portions being concentric about the vertical central axis, wherein the upper and lower peripheral wall portions abut an external surface of the medial wall portion.

13. The mold of claim 12 wherein the at least two separate portions of the medial one of the bodies are identical in shape.

14. The mold of claim 12 wherein the upper body rests on the medial body and the medial body rests on the lower body thereby aligning the inside cavity surface with the central axis.

* * * * *